United States Patent
Pepper et al.

(10) Patent No.: US 9,684,580 B2
(45) Date of Patent: Jun. 20, 2017

(54) METHODS, SYSTEMS, AND COMPUTER READABLE MEDIA FOR EFFICIENT SCRAMBLING OF DATA FOR LINE RATE TRANSMISSION IN HIGH SPEED COMMUNICATIONS NETWORKS

(71) Applicant: Ixia, Calabasas, CA (US)

(72) Inventors: Gerald Raymond Pepper, Newbury Park, CA (US); Robert Brian Luking, Ellicott City, MD (US)

(73) Assignee: IXIA, Calabasas, CA (US)

( * ) Notice: Subject to any disclaimer, the term of this patent is extended or adjusted under 35 U.S.C. 154(b) by 175 days.

(21) Appl. No.: 14/533,505

(22) Filed: Nov. 5, 2014

(65) Prior Publication Data

US 2015/0135014 A1     May 14, 2015

Related U.S. Application Data

(60) Provisional application No. 61/900,367, filed on Nov. 5, 2013.

(51) Int. Cl.
     *G06F 11/00*      (2006.01)
     *G06F 11/263*     (2006.01)
     *G06F 21/60*      (2013.01)

(52) U.S. Cl.
     CPC ............ *G06F 11/263* (2013.01); *G06F 21/60* (2013.01)

(58) Field of Classification Search
     CPC ........ G06F 11/263; G06F 21/606; H04B 1/00
     See application file for complete search history.

(56) References Cited

U.S. PATENT DOCUMENTS

| | | | | |
|---|---|---|---|---|
| 3,657,699 A | * | 4/1972 | Rocher | G11C 19/00 341/81 |
| 3,925,611 A | * | 12/1975 | Dennis | H04L 25/4917 341/76 |
| 5,778,013 A | | 7/1998 | Jedwab | |
| 6,029,186 A | | 2/2000 | DesJardins et al. | |

(Continued)

OTHER PUBLICATIONS

"IEEE Standard for Ethernet," IEEE Std 802.3™-2012 (Revision of IEEE Std 802.3-2008), IEEE, pp. 1-633 (Dec. 28, 2012).

(Continued)

*Primary Examiner* — Bryce Bonzo
*Assistant Examiner* — Jonathan Gibson
(74) *Attorney, Agent, or Firm* — Jenkins, Wilson, Taylor & Hunt, P.A.

(57) ABSTRACT

The subject matter described herein includes methods, systems, and computer readable media for efficiently scrambling data in high speed communications networks. One exemplary method includes, in a network equipment test device, providing a scrambler for scrambling data to be transmitted to a device under test. Scrambling the data includes separating a scrambling algorithm into a scramble key portion and a data portion. Scrambling the data further includes pre computing and storing the scramble key portion. Scrambling the data further includes precomputing and storing the data portion. Scrambling the data further includes logically combining the precomputed scramble key portion with the precomputed data portion to produce a data bus width scrambled output data. The method further includes transmitting the scrambled output data over a network to the device under test.

15 Claims, 4 Drawing Sheets

(56) References Cited

U.S. PATENT DOCUMENTS

| | | | | |
|---|---|---|---|---|
| 7,212,633 B2* | 5/2007 | Yokota | ...................... | H04L 9/14 380/44 |
| 7,639,800 B2* | 12/2009 | Kasuya | ................... | G09C 1/00 380/29 |
| 8,000,477 B2* | 8/2011 | Verdun | ................... | H04L 9/065 380/265 |
| 2002/0136400 A1* | 9/2002 | Askerov | ................. | H04L 9/065 380/28 |
| 2004/0062397 A1* | 4/2004 | Amer | ............... | H04L 25/03872 380/268 |
| 2009/0086972 A1* | 4/2009 | Mozak | ................... | G06F 7/584 380/268 |
| 2010/0150346 A1* | 6/2010 | Nonaka | ................ | H04L 9/0618 380/252 |
| 2013/0016832 A1* | 1/2013 | Yamashita | ............ | G06F 21/606 380/44 |
| 2014/0281844 A1 | 9/2014 | Jiang et al. | | |
| 2015/0007003 A1 | 1/2015 | Pepper et al. | | |

OTHER PUBLICATIONS

Final Office Action for U.S. Appl. No. 13/933,105 (May 19, 2016).
Non-Final Office Action for U.S. Appl. No. 13/933,105 (Jul. 17, 2015).
Notice of Allowance and Fee(s) Due for U.S. Appl. No. 13/933,105 (Aug. 31, 2016).
Advisory Action Before the Filing of an Appeal Brief and AFCP 2.0 Decision for U.S. Appl. No. 13/933,105 (Aug. 2, 2016).

* cited by examiner

METHODS, SYSTEMS, AND COMPUTER READABLE MEDIA FOR EFFICIENT SCRAMBLING OF DATA FOR LINE RATE TRANSMISSION IN HIGH SPEED COMMUNICATIONS NETWORKS

PRIORITY CLAIM

This application claims the priority benefit of U.S. Provisional Patent Application Ser. No. 61/900,367 filed Nov. 5, 2013, the disclosure of which is incorporated herein by reference in its entirety.

TECHNICAL FIELD

The subject matter described herein relates to scrambling data signals. More particularly, the subject matter described herein relates to methods, systems, and computer readable media for efficient scrambling of data for line rate transmission in high speed communications networks.

BACKGROUND

In today's high speed networks, such as 100 Gigabit (100 G) and 400 Gigabit (400 G) Ethernet networks, data is scrambled with a scramble key before being transmitted on the wire to reduce undesirable frequency characteristics and to facilitate descrambling at the receiver. For example, transmitting a long sequence of ones or zeros results in spikes at specific frequencies and inefficiently utilizes the frequency bandwidth allocated for the transmitted signal. In addition, a long sequence of ones or zeros makes synchronization at the receiver difficult due to the lack of transitions in the transmitted signal. Transmitters use a scramble key and a corresponding scrambling algorithm to reduce the likelihood of long sequences of ones and zeros and thereby spread the frequency spectrum of the transmitted signal over a wider frequency bandwidth.

Scrambling data at line rates in high speed networks can be difficult. In 100 G Ethernet, 400 G Ethernet, and beyond, data bus widths can be on the order of hundreds of bits in order to transmit data at line rates. Scrambling data at line rate on such wide busses requires that an entire bus width of data be scrambled during each clock cycle. Scrambling an entire bus width of data when the bus is on the order of hundreds of bits wide requires that the scrambler logically implement the shift and XOR operations for each bit on the data bus being scrambled. While such logic implementations are possible, physical real estate on a chip for implementing a scrambler may be limited.

Accordingly, there exists a long felt need for methods, systems, and computer readable media for efficiently implementing a scrambler for scrambling data in high speed communications networks.

SUMMARY

The subject matter described herein includes methods, systems, and computer readable media for efficiently scrambling data in high speed communications networks. One exemplary method includes, in a network equipment test device, providing a scrambler for scrambling data to be output to a device under test. Scrambling the data includes separating a scrambling algorithm into a scramble key portion and a data portion. Scrambling the data further includes precomputing and storing the scramble key portion. Scrambling the data further includes precomputing and storing the data portion. Scrambling the data further includes logically combining the precomputed scramble key portion with the precomputed data portion to produce a data bus width scrambled output data. The method further includes transmitting the scrambled output data over a network to the device under test.

By "precomputing", it is meant that the scramble key portion and the data portion are computed in advance of being logically combined with each other.

In addition, the subject matter described herein is described as being implemented by "blocks". It is understood that such blocks refer to processing hardware and/or firmware for performing the indicated functions.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
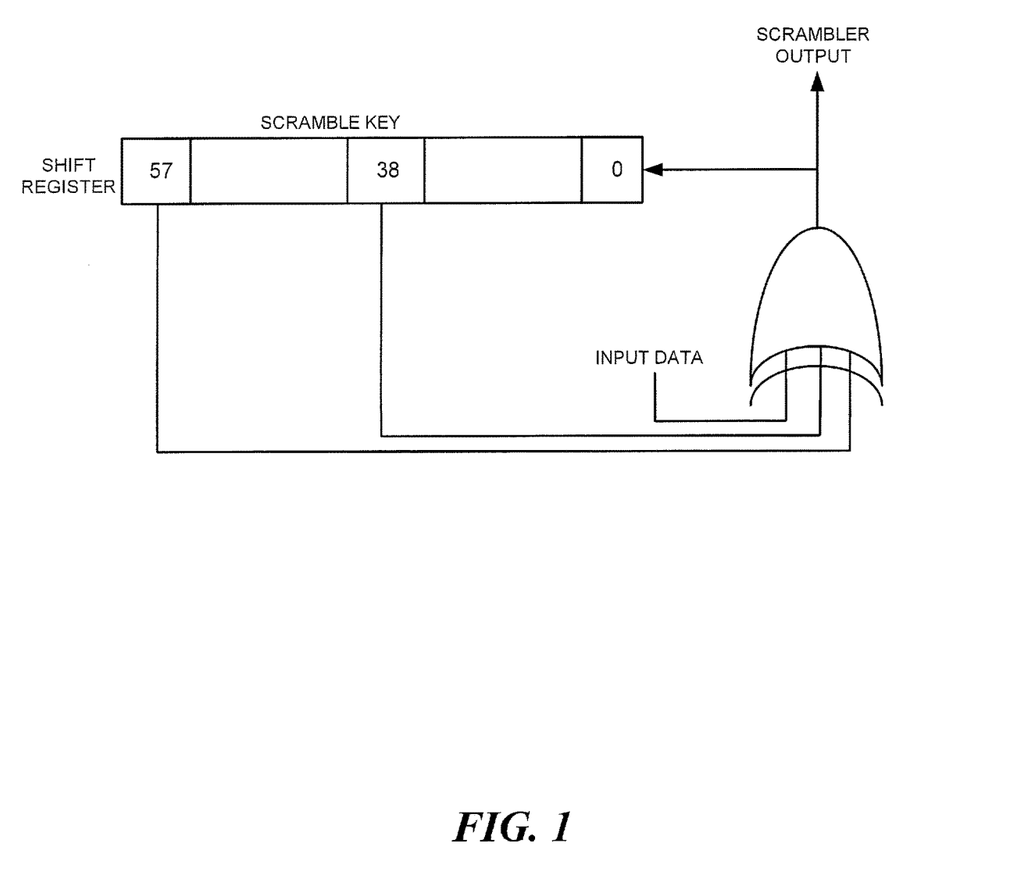
FIG. 1 is a block diagram illustrating a conventional implementation of a self synchronizing scrambling algorithm for a high speed network.

The subject matter described herein includes methods, systems, and computer readable media for efficient scrambling of data for line rate transmission in a high speed communications network. FIG. 1 is a block diagram of a conventional scrambling algorithm for implementation in a high speed communications network. Referring to FIG. 1, in a conventional scrambling algorithm for 100 G and 400 G Ethernet, each data bit is scrambled by XORing the data bit with bit 38 and bit 57 of a scramble key. The output of the XOR operation is then fed into a shift register that holds the scramble key, and the output becomes the new first bit of the scramble key. If only one bit were being scrambled at a time, then the scrambler could be implemented using a shift register and a three input XOR gate. However, because an entire bus width of data must be scrambled during each clock cycle, the scrambler must, during each clock cycle, logically implement the scrambling that would occur for each data bit on the bus at that time. For example, Equation 1 represents the scrambling algorithm illustrated in FIG. 1:

$$SO_n = D_n \oplus S57 \oplus S38, \quad (1)$$

where $SO_n$ is the scrambler output for data bit $D_n$ and S57 and S18 are the fifty-seventh and eighteenth bit of the scramble key, respectively. Thus, the scrambler output for data bit zero would be:

$$SO_0 = D_0 \oplus S57 \oplus S18. \quad (2)$$

Because the scrambler must scramble all of the bits on the data bus in a single clock cycle and the scramble key must be loaded with the data output and shifted for each bit, using a 256 bit bus as an example, the scrambler outputs for iteration 0 through 255 of the shift operations illustrated in FIG. 1 must be implemented. Until the data bits are shifted into scrambler key positions 18 and 57, which are XORed with the input data, the scrambler output is relatively simple to compute. For example, the first three scrambled output bits can be computed as follows:

$$SO_0 = D_0 \oplus S57 \oplus S38 \quad (3)$$

$$SO_1 = D_1 \oplus S56 \oplus S37 \quad (4)$$

$$SO_2 = D_2 \oplus S55 \oplus S36 \quad (5)$$

The equation for scrambler output becomes increasingly more complex as the data bus width increases because the output depends on the scramble key, which depends on the scrambler output for previous input data bits. For example, for the $38^{th}$ bit on the data bus, the equation for the scrambler output may be:

$$SO_{38} = D_{38} \oplus S_{38}^{19} \oplus S_{38}^{0}, \quad (6)$$

where $S_{38}^{19}$ is the value of the $19^{th}$ position in the scramble key after the $38^{th}$ iteration of the scrambling algorithm (beginning with iteration zero) and $S_{38}^{0}$ is the value in the $0^{th}$ position of the scramble key after the $38^{th}$ iteration of the scrambling algorithm. The term $S_{38}^{19}$ stores the value $SO_{18}$, which is the scrambler output after the $18^{th}$ iteration of the scrambling algorithm, which can be expanded as follows:

$$S_{38}^{19} = SO_{18} = D_1 \oplus S39 \oplus S20,$$

where S39 and S20 are the values stored in the $39^{th}$ and $20^{th}$ positions of the original scramble key. The remaining term from Equation 6, $S_{38}^{0}$, which stores the scrambler output after the $37^{th}$ iteration of the scrambling algorithm can be expanded as follows:

$$S_{38}^{0} = SO_{37}$$
$$= D_{37} \oplus SO_{20} \oplus SO_1$$
$$= D_{37} \oplus SO_{20} \oplus D_1 \oplus S56 \oplus S37$$
$$= D_{37} \oplus D_{20} \oplus S37 \oplus S18 \oplus D_1 \oplus S56 \oplus S37$$

Fully expanded, Equation 6, which is the equation for the $38^{th}$ bit on the data bus becomes:

$$SO_{38} = D_{38} \oplus D_{18} \oplus S39 \oplus S20 \oplus D_{37} \oplus D_{20} \oplus S37 \oplus S18 \oplus D_1 \oplus S56 \oplus S37 \quad (7)$$

Each term in Equation 7 represents a logic element needed to store the associated value. Exclusive OR gates are also required to implement the computations. Thus, Equation 7 requires 11 logic elements to store the equation terms plus a ten-input exclusive OR gate to combine the values and an additional logic element to store the output, for a total of 13 logic elements. Equation 7 is only the equation for scrambling the $38^{th}$ bit on the data bus. Similar equations must be implemented for the remaining bits on the data bus. The logic elements required to implement such equations increases in number as data bus widths increase. While such logic could be implemented, scrambler chip real estate is a finite resource, and implementing the logic to calculate the scrambler output for each bit on a wide data bus is impractical.

Accordingly, to avoid this difficulty, a network equipment test device that tests gigabit Ethernet or other high speed equipment has knowledge of the data that will be transmitted during a given iteration of the test. With such knowledge, the scrambler output for a full data bus width of data at a given clock cycle can be viewed as:

$$\text{Scrambler output} = f(\text{scramble key}) \oplus f(\text{data}) \quad (8)$$

The term f(scramble key) represents the effect of the scramble key on the scrambler output and the term f(data) represents the effect of the data on the scrambler output. f(data) can be precomputed by setting the entire scramble key to all zeros and computing f(data) for an entire data bus width of data. $f_n(\text{data})$ for each bit of an n bit data bus can be computed as follows:

$$f_n(\text{data}) = D_n \oplus S57 \oplus S38 \quad (9)$$

Thus, $f_0(\text{data})$ is:

$$f_0(\text{data}) = D_0 \oplus 0 \oplus 0 = D_0 \quad (10)$$

Similarly, Equations 3-5 simplify to:

$$f_1(\text{data}) = D_1 \oplus 0 = D_1 \quad (11)$$

$$f_2(\text{data}) = D_2 \oplus 0 = D_2 \quad (12)$$

$$f_3(\text{data}) = D_3 \oplus 0 = D_3 \quad (13)$$

Equation 7 becomes:

$$SO_{38} = D_{38} \oplus D_{18} \oplus S39 \oplus S20 \oplus D_{37} \oplus D_{20} \oplus S37 \oplus S18 \oplus \quad (14)$$
$$D_1 \oplus S56 \oplus S37$$
$$= D_{38} \oplus D_{18} \oplus 0 \oplus 0 \oplus D_{37} \oplus D_{20} \oplus 0 \oplus 0 \oplus D_1 \oplus 0 \oplus 0$$
$$= D_{38} \oplus D_{18} \oplus D_{37} \oplus D_{20} \oplus D_1$$

Similar calculations can be performed for each bit on the data bus at a given time.

Once f(data) has been computed by using all zeros for the scramble key, the next step is to precompute f(scramble key) assuming all zeros for the input data. f(scramble key) can be computed as follows:

$$f_n(\text{scramble key}) = 0 \oplus S57 \oplus S38 \quad (15)$$

Thus, $$f_0(\text{scramble key}) = 0 \oplus S57 \oplus S38 = S57 \oplus S38 \quad (16)$$

$$f_1(\text{scramble key}) = 0 \oplus S56 \oplus S37 = S56 \oplus S37 \quad (17)$$

$$f_2(\text{scramble key}) = 0 \oplus S55 \oplus S36 = S55 \oplus S36 \quad (18)$$

-continued $$f_3(\text{scramble key}) = 0 \oplus S54 \oplus S35 = S54 \oplus S35 \quad (19)$$

...

$$f_{38}(\text{scramble key}) = 0 \oplus S19 \oplus S0 = S19 \oplus S0 \quad (20)$$

$$f_{39}(\text{scramble key}) = 0 \oplus S18 \oplus f_0(\text{scramble key}) \quad (21)$$
$$= S18 \oplus S57 \oplus S38$$

$$f_{40}(\text{scramble key}) = 0 \oplus S17 \oplus f_1(\text{scramble key}) \quad (22)$$
$$= S17 \oplus S56 \oplus S37$$

$$f_{41}(\text{scramble key}) = 0 \oplus S16 \oplus f_2(\text{scramble key}) \quad (23)$$
$$= S16 \oplus S55 \oplus S36$$

...

$$f_{57}(\text{scramble key}) = 0 \oplus S0 \oplus f_{18}(\text{scramble key}) \quad (24)$$
$$= S0 \oplus S39 \oplus S20$$

$$f_{58}(\text{scramble key}) = 0 \oplus f_1(\text{scramble key}) \oplus \quad (25)$$
$$f_{19}(\text{scramble key})$$
$$= S56 \oplus S37 \oplus S38 \oplus S19$$

...

Even though Equations 15-25 for computing f(scramble key) for each data bit on the data bus during a given clock cycle show an increasing number of terms with the number of iterations for the data bus width, because all of the data bits are zeros, the function f(scramble key) depends only on the original scramble key bits themselves. As a result, values for each iteration of f(scramble key) can be precomputed and stored.

Once f(scramble key) and f(data) have been precomputed for each bit currently on the data bus, the scrambler output can be computed using Equation 8 and a single 2 input exclusive OR gate using the two values stored for each bit on the data bus. Exemplary computations that may be performed are as follows:

$$\text{Scrambler output}_n = f_n(\text{scramble key}) \oplus f_n(\text{data}) \quad (26)$$

$$\text{Scrambler output}_0 = f_0(\text{scramble key}) \oplus f_0(\text{data}) \quad (27)$$

$$\text{Scrambler output}_1 = f_1(\text{scramble key}) \oplus f_1(\text{data}) \quad (28)$$

Because the values for $f_n(\text{scramble key})$ and $f_n(\text{data})$ are precomputed and stored, the scrambler output can be computed at line rate for 100 G Ethernet, 400 G Ethernet, or higher data rates.

Figure 2:
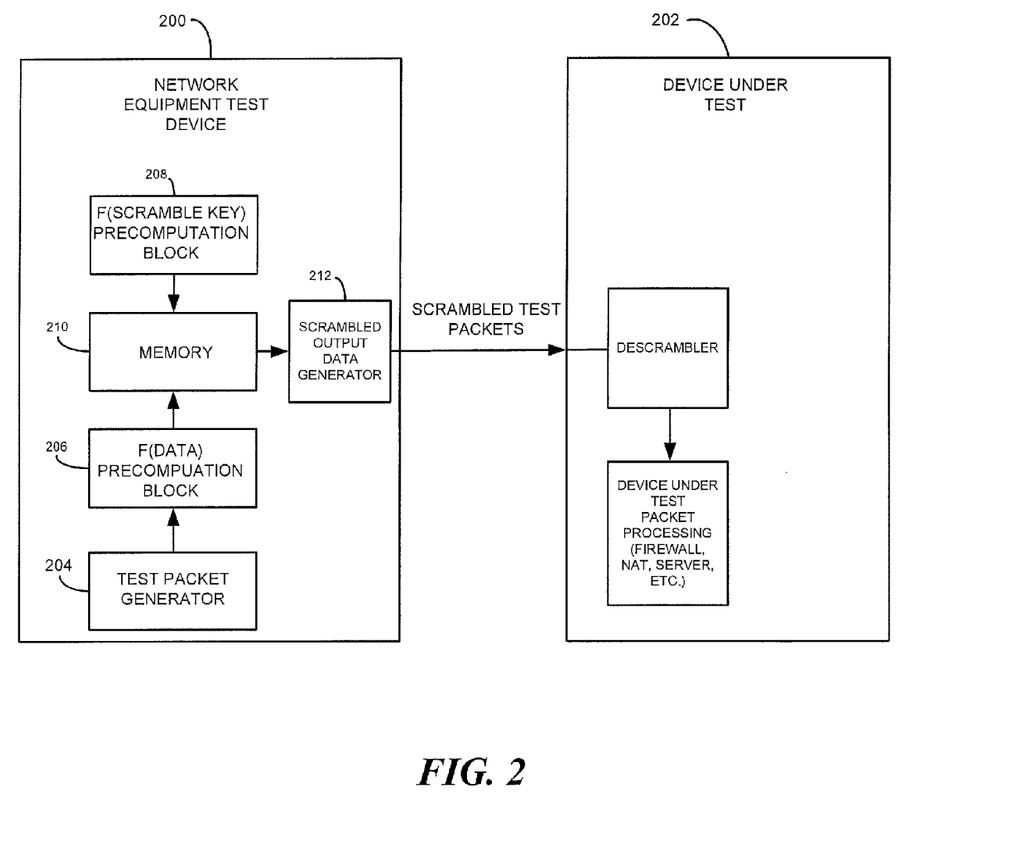
FIG. 2 is a block diagram illustrating a network equipment test device for using efficient scrambling of data in testing a device under test according to an embodiment of the subject matter described herein.

FIG. 2 is a block diagram illustrating an exemplary network device test system that implements efficient scrambling of data according to an embodiment of the subject matter described herein. Referring to FIG. 2, a network equipment test device 200 transmits test packets to a device under test 202. Network device test system 200 may include a test packet generator 204 that generates test packets at line rate. Test packet generator 204 may be capable of generating test packets at 100 G Ethernet, 400 G Ethernet, or greater rates. Device under test 202 may be any suitable network device for which it is useful to monitor the response to test packets. For example, device under test 202 may be a firewall, a network address translator, a server, a router, or other network device.

In order to scramble packets at line rate, network equipment test device 200 includes an f(data) precomputation block 206 for computing the effect of the data on the scrambler output and an f(scramble key) precomputation block 208 for computing the effect of the scramble key on the output. F(data) precomputation block 206 may compute $f_n(\text{data})$ as described above with regard to Equations 9-13. f(scramble key) calculation block may compute $f_n(\text{scramble key})$ using Equations 15-25 described above. The output of f(data) precomputation block 206 and f(scramble key) precomputation block 208 may be stored in memory 210. A scrambler output data generator 212 may compute the scrambler output using the stored values for f(scramble key) and f(data) using Equations 26-28 as described above.

Accordingly, by precomputing $f_n(\text{scramble key})$ and $f_n(\text{data})$, the subject matter described herein enables line rate scrambling of data at 100 G, 400 G, and higher data rates without requiring complex logic to implement.

Figure 3:
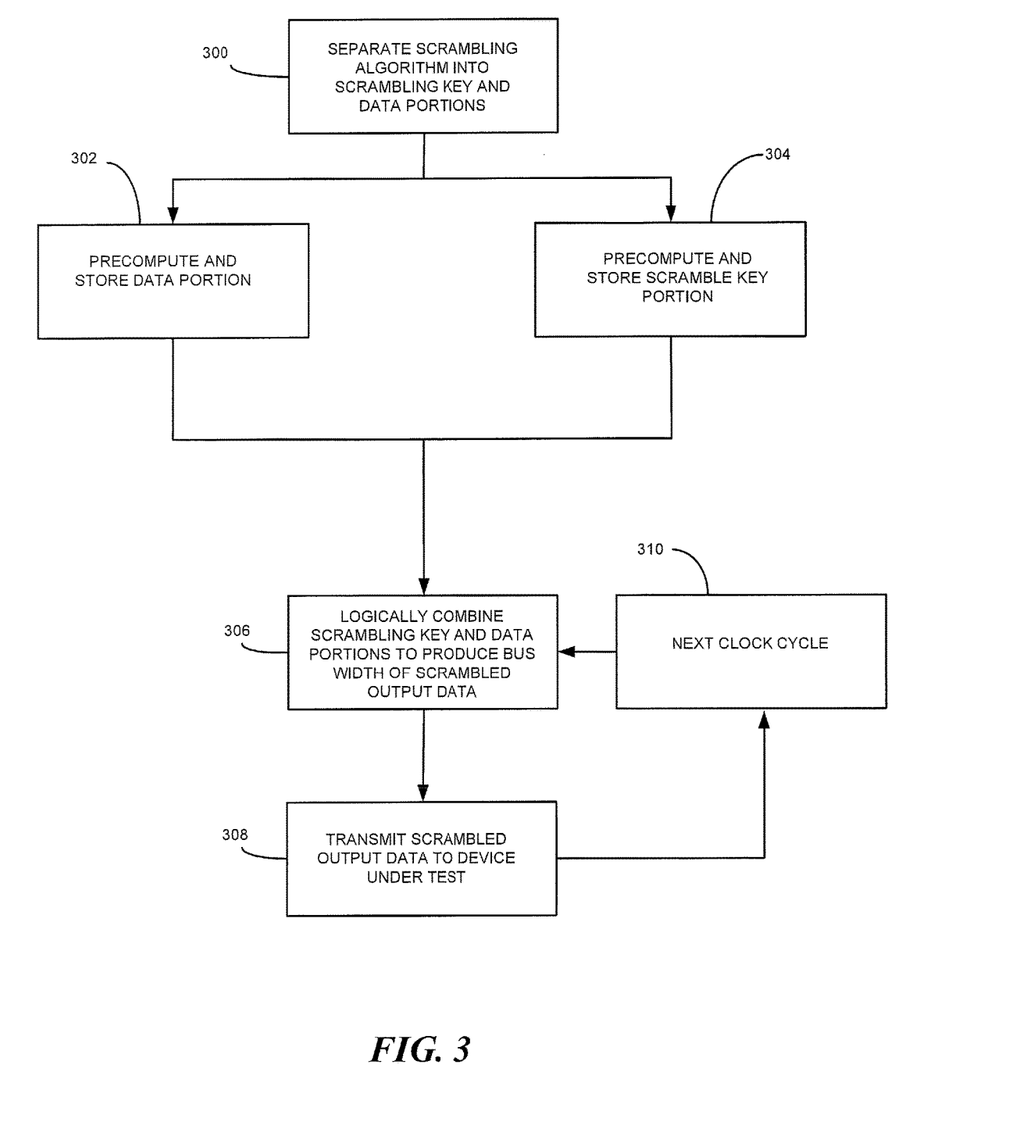
FIG. 3 is a flow chart illustrating an exemplary process for efficient scrambling of data for line rate transmission in high-speed communications networks according to an embodiment of the subject matter described herein.

FIG. 3 is a flow chart illustrating an exemplary process for efficient line rate scrambling of data according to an embodiment of the subject matter described herein. Referring to FIG. 3, in step 300, a scrambling algorithm is separated into a scramble key portion and a data portion. For example, a scrambling algorithm may be separated into f(scramble key), which represents the independent effect of the scramble key on the scrambler output and the term f(data), which represents the independent effect of the data on the scrambler output. In step 302, the method includes precomputing and storing the data portion. For example, $f_n(\text{data})$ may be computed using Equations 9-14 as described above for each data bit on the data bus to be transmitted at the same time. Because $f_n(\text{data})$ depends only on the data bits on the bus at a given time, step 302 may include precomputing and storing $f_n(\text{data})$ for plural bus widths of data to be transmitted at different times. The amount of data for which $f_n(\text{data})$ is precomputed may depend on available memory for storing precomputed values and the desired data output rate to be achieved.

In step 304, the method includes precomputing and storing the scramble key portion. For example, $f_n(\text{scramble key})$ may be precomputed using Equations 15-25, as described above. Like the computations for f((data), the computations for $f_n(\text{scramble key})$ may be performed in advance of a given clock cycle and then logically combined with $f_n(\text{data})$ during a given clock cycle for generating the scrambler output. Thus, step 304 may include computing $f_n(\text{scramble key})$ for multiple upcoming clock cycles and storming the precomputed values.

In step 306, the method includes logically combining the precomputed scramble key portion with the precomputed data portion to produce a data bus width of scrambled output data. For example, the scrambler output may be computed for each bit on the data bus during a clock cycle using Equations 26-28 as described above. In step 308, the method includes transmitting the scrambled output data. For example, a bus width of scrambled output data may be transmitted by a network equipment test device 200 to device under test 202. In step 310, the next clock cycle occurs and control returns to step 306 where the process is repeated for the precomputed values for $f_n(\text{data})$ for the data bits on the data bus for the next clock cycle and the precomputed values for $f_n(\text{scramble key})$.

As illustrated in FIG. 3, steps 302 and 304 may be performed in parallel, such that the precomputed scramble key portion values are computed in parallel with the precomputed data portion values. The precomputed values are then logically combined in step 306.

Figure 4:
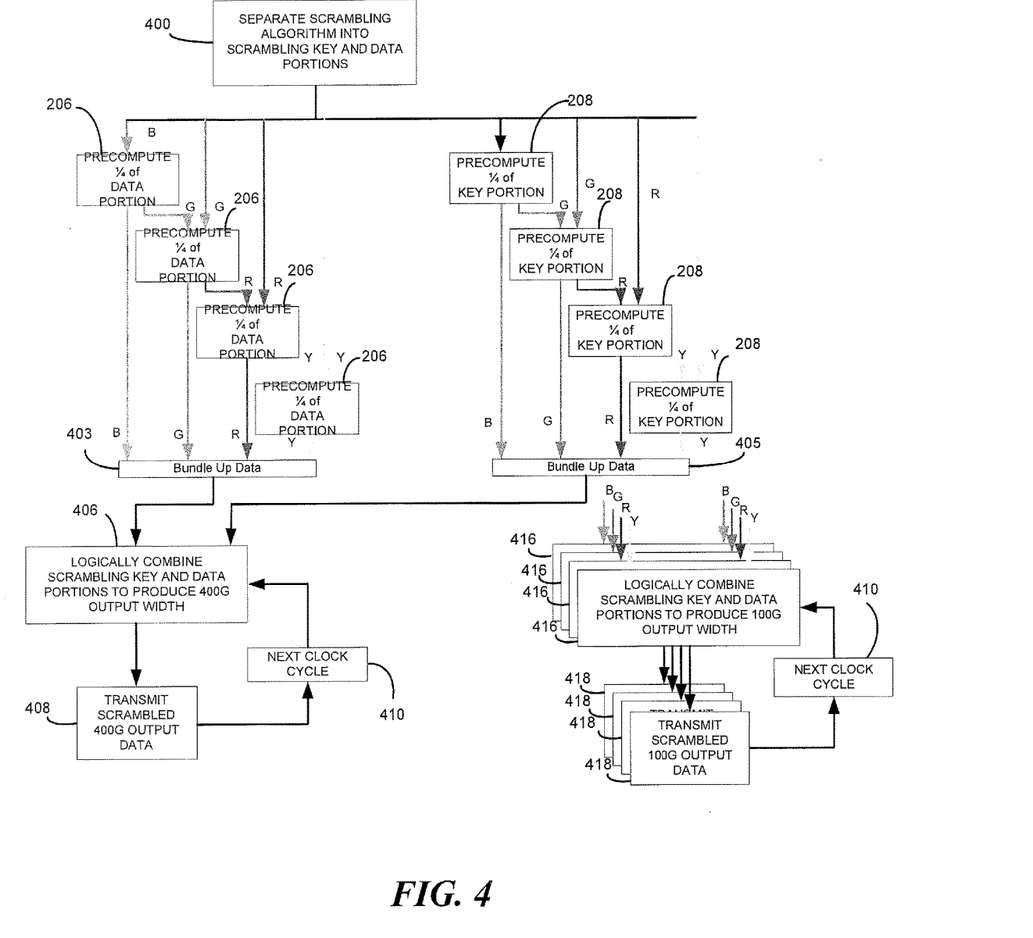
FIG. 4 is a combined flow chart and block diagram illustrating a pipelined, parallelized architecture for scrambling data according to an embodiment of the subject matter described herein.

The scrambler architecture described herein can be pipelined and parallelized to scramble a data bus of a desired bit width and achieve a desired output line rate. FIG. 4 is a block and flow diagram that illustrates the pipelining of the f(data) and f(scramble key) calculation portions and the parallelizing of the output of the logical combination blocks. Referring to FIG. 4, block 400 represents the logical separation of the scrambling algorithm into the data portion f(data) and the scramble key portion f(scramble key), as described above. In this example, a 1024 bit bus width is assumed. The precomputation of f(data) for the 1024 bit bus is divided into four 256 bit units, and blocks 206 each compute f(data) for one of the four 256 bit portions of the data on the bus during a given clock cycle. It should be noted that blocks 206 form a pipeline, where each precomputation block 206 (other than the last precomputation block 206 in the pipeline) feeds the next precomputation block 206 in the pipeline and also provides its output to a buffer 403, which stores the precomputed value for f(data) for a given clock cycle.

The links associated with each 256 bit portion of data are labeled in FIG. 4 with "B", "G", "R", or "Y" to indicate blue, green, red, or yellow and illustrate the separate processing of each portion. For example, the link entering the first f(data) precomputation block 206 in the pipeline is labeled "B" to indicate the processing of the first 256 bits of data. The output of the first f(data) precomputation block 206 to buffer 403 is also labeled "B" to indicate that the first portion of the precomputed data stored in buffer 403 corresponds to the first 256 bits of data. The same output produced by the first f(data) precomputation block 206 that is buffered for the first 256 bits of data is provided to the second f(data) precomputation block 206 in the pipeline for the computation of f(data) for the next 256 bits of data on the bus. The output from the first f(data) precomputation block 206 that feeds the next f(data) precomputation block is labeled "G" to indicate that this output is used for the computation of f(data) for the next 256 bits on the bus. Similar labeling conventions are used for the links entering and exiting each f(data) precomputation block 206.

In FIG. 4, the precomputation of f(scramble key) is also divided into four pipelined portions. Each f(scramble key) precomputation block 208 precomputes f(scramble key) for ¼ of the bits of the scramble key. F(scramble key) precomputation blocks 208 form a pipeline by feeding each subsequent f(scramble key) precomputation block 208 and providing their output to a buffer 405. The same color labels used for the links associated with the f(data) precomputation blocks are used for the f(scramble key) precomputation blocks.

Logical combination blocks 416 logically combine the precomputed f(data) and f(scramble key) portions, e.g., using an XOR operation as described above. The labels on each input link to logical combination blocks 416 indicate the corresponding f(data) and f(scramble key) portions being logically combined by the respective block. For example, the topmost logical combination block combines the yellow precomputed f(data) value with the yellow precomputed f(scramble key) value. The remaining logical combination blocks 416 perform logical combinations of their respective f(data) and f(scramble key) portions. Thus, each set of precomputation blocks 206 and 208 and their respective logical combination and output blocks 416 and 418 for a particular color label can be considered a separate scrambler capable of scrambling m bits per clock cycle. In general, n scramblers, each capable of scrambling m bits per clock cycle can be connected in the pipelined, parallel architecture illustrated in FIG. 4 to scramble n*m bits per clock cycle. Alternatively, a single scrambler capable of processing n*m bits per clock cycle can be implemented without using the pipelined, parallelized architecture illustrated in FIG. 4.

In FIG. 4, block 406 represents the parallelized output of logical combination blocks 416. Similarly, block 408 represents the parallelized output data transmission blocks 418. The output of the pipelined, parallelized scrambler illustrated in FIG. 4 is 1024 scrambled data bits per clock cycle. Assuming a 400 MHz clock, a line rate of 400 Gbps can be achieved.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for efficient scrambling of data for line rate transmission in a high-speed communications network, the method comprising:

in a network equipment test device:
providing a scrambler for scrambling data to be output to a device under test, wherein scrambling the data includes:
separating a scrambling algorithm into a scramble key portion and a data portion, wherein each nth output bit of the scrambling algorithm is equal to a logical combination of an nth data bit and values of predetermined bit positions of a scramble key, where the values of the predetermined bit positions are determined by bit shifting the output bits of the scrambling algorithm into the predetermined bit positions;
precomputing and storing the scramble key portion, wherein precomputing and storing the scramble key portion includes, setting the data bits to a fixed value and applying the scrambling algorithm using the scramble key and the fixed value of the data bits as inputs to compute $f_n$(scramble key), where $f_n$(scramble key) represents an effect of an nth scramble key bit on an nth output bit of the scrambling algorithm, and storing $f_n$(scramble key) for each nth data bit;
precomputing and storing the data portion, wherein precomputing and storing the data portion includes setting the scramble key to a fixed value and applying the scrambling algorithm using the data bits and the fixed value of the scramble key as inputs to compute $f_n$(data), where $f_n$(data) represents an effect of an nth data bit on the nth output bit of the scrambling algorithm, and storing $f_n$(data) for each nth data bit;
logically combining $f_n$(scramble key) with $f_n$(data) for each nth data bit to produce a data bus width of scrambled output data; and
transmitting the scrambled output data over a network to the device under test.

2. The method of claim 1 wherein the scramble key portion represents an independent effect of the scramble key on output of the scrambler and the data portion represents an independent effect of the data on the output of the scrambler.

3. The method of claim 1 wherein precomputing the data portion includes precomputing the data portion for a plurality of bus widths of data for upcoming clock cycles, wherein precomputing the scramble key portion includes precomputing scramble key portion for the upcoming clock cycles, and wherein logically combining the precomputed scramble key portion and the precomputed data portion includes logically combining the precomputed scramble key and data portions for each of the upcoming clock cycles.

4. The method of claim 1 wherein precomputing the scramble key and data portion includes precomputing the scramble key portion in parallel with the precomputing of the data portion.

5. The method of claim 1 comprising connecting x scramblers together, each capable of scrambling y bits per clock cycle, x and y being integers, to scramble x*y bits per clock cycle.

6. The method of claim 5 wherein connecting the x scramblers together includes pipelining the precomputing of the data portions and the scramble key portions and parallelizing the logically combining of the data portions and the scramble key portions and the transmitting of the scrambled data.

7. The method of claim 1 wherein the scrambling algorithm is structured to reduce undesirable frequency characteristics caused by a long sequence of ones or zeros in the data and to facilitate descrambling by the device under test.

8. A system for efficient scrambling of data for line rate transmission in a high-speed communications network, the system comprising:
  a network equipment test device comprising:
    a scrambler including:
      a scramble key precomputation block for precomputing and storing a scramble key portion of a scramble algorithm, wherein each nth output bit of the scrambling algorithm is equal to a logical combination of an nth data bit and values of predetermined bit positions of a scramble key, where the values of the predetermined bit positions are determined by bit shifting the output bits of the scrambling algorithm into the predetermined bit positions;
      wherein precomputing and storing the scramble key portion includes, setting the data bits to a fixed value and applying the scrambling algorithm using the scramble key and the fixed value of the data bits as inputs to compute $f_n$(scramble key), where $f_n$(scramble key) represents an effect of an nth scramble key bit on an nth output bit of the scrambling algorithm and storing $f_n$(scramble key) for each nth data bit;
      a data portion precomputation block for precomputing and storing a data portion of a scramble algorithm, wherein precomputing and storing the data portion includes setting the scramble key to a fixed value and applying the scrambling algorithm using the data bits and the fixed value of the scramble key as inputs to compute $f_n$(data), where $f_n$(data) represents an effect of an nth data bit on the nth output bit of the scrambling algorithm and storing $f_n$(data) for each nth data bit; and
      a scrambled output data generator for logically combining $f_n$(scramble key) with $f_n$ data for each nth data bit to produce a data bus width of scrambled output data and for transmitting the scrambled output data over a network to a device under test.

9. The system of claim 8 wherein the scramble key portion represents an independent effect of the scramble key on output of the scrambler and the data portion represents an independent effect of the data on the output of the scrambler.

10. The system of claim 8 wherein the data portion precomputation block is configured to precompute the data portion for a plurality of bus widths of data for upcoming clock cycles, wherein the scramble key precomputation block is configured to precompute the scramble key portion for the upcoming clock cycles, and wherein scrambled output data generator is configured to logically combine the precomputed scramble key and data portions for each of the upcoming clock cycles.

11. The system of claim 8 wherein the scramble key precomputation block is configured to precompute the scramble key portion in parallel with the precomputing of the data portion by the data portion precomputation block.

12. The system of claim 8 comprising x scramblers connected together, each capable of scrambling y bits per clock cycle, x and y being integers, to scramble x*y bits per clock cycle.

13. The system of claim 12 wherein the x scramblers are connected together by pipelining the precomputing of the data portions and the scramble key portions and parallelizing the logically combining of the data portions and the scramble key portions and the transmitting of the scrambled data.

14. The system of claim 8 wherein the scrambling algorithm is structured to reduce undesirable frequency characteristics caused by a long sequence of ones or zeros in the data and to facilitate descrambling by the device under test.

15. A non-transitory computer readable medium having stored thereon executable instructions that when executed by the processor of a computer control the computer to perform steps comprising:
  in a network equipment test device:
    providing a scrambler for scrambling data to be output to a device under test, wherein scrambling the data includes:
      separating a scrambling algorithm into a scramble key portion and a data portion, wherein each nth output bit of the scrambling algorithm is equal to a logical combination of an nth data bit and values of predetermined bit positions of a scramble key, where the values of the predetermined bit positions are determined by bit shifting the output bits of the scrambling algorithm into the predetermined bit positions;
      precomputing and storing the scramble key portion, wherein precomputing and storing the scramble key portion includes, setting the data bits to a fixed value and applying the scrambling algorithm using the scramble key and the fixed value of the data bits as inputs to compute $f_n$(scramble key), where $f_n$(scramble key) represents an effect of an nth scramble key bit on an nth output bit of the scrambling algorithm and storing $f_n$(scramble key) for each nth data bit;
      precomputing and storing the data portion, wherein precomputing and storing the data portion includes setting the scramble key to a fixed value and applying the scrambling algorithm using the data bits and the fixed value of the scramble key as inputs to compute $f_n$(data), where $f_n$(data) represents an effect of an nth data bit on the nth output bit of the scrambling algorithm and storing $f_n$(data) for each nth data bit;
      logically combining $f_n$(scramble key) with $f_n$(data) for each nth data bit to produce a data bus width of scrambled output data; and
      transmitting the scrambled output data over a network to the device under test.

* * * * *